United States Patent
Tsai

(10) Patent No.: US 9,326,607 B2
(45) Date of Patent: May 3, 2016

(54) ROTATABLE ARMREST

(71) Applicant: Po-Chuan Tsai, Tainan (TW)

(72) Inventor: Po-Chuan Tsai, Tainan (TW)

(*) Notice: Subject to any disclaimer, the term of this patent is extended or adjusted under 35 U.S.C. 154(b) by 200 days.

(21) Appl. No.: 14/174,877

(22) Filed: Feb. 7, 2014

(65) Prior Publication Data

US 2015/0223610 A1 Aug. 13, 2015

(51) Int. Cl.
*A47C 7/54* (2006.01)
*A47C 1/03* (2006.01)
*B60N 2/46* (2006.01)

(52) U.S. Cl.
CPC . *A47C 1/03* (2013.01); *A47C 7/543* (2013.01); *B60N 2/4606* (2013.01); *B60N 2/4633* (2013.01); *B60N 2/4646* (2013.01)

(58) Field of Classification Search
USPC ................................ 297/411.32, 411.38, 115
See application file for complete search history.

(56) References Cited

U.S. PATENT DOCUMENTS

| | | | | |
|---|---|---|---|---|
| 5,275,465 A | * | 1/1994 | Gulliver | A47B 83/02 248/287.1 |
| 7,832,805 B1 | * | 11/2010 | Lai | A47C 1/03 297/411.32 |
| 2003/0057759 A1 | * | 3/2003 | Kain | A47C 7/543 297/411.32 |
| 2007/0164594 A1 | * | 7/2007 | Yang | A47C 1/03 297/411.32 |
| 2009/0309407 A1 | * | 12/2009 | Saito | A47C 7/543 297/411.32 |

* cited by examiner

*Primary Examiner* — David E Allred
(74) *Attorney, Agent, or Firm* — Alan D. Kamrath; Kamrath IP Lawfirm, P.A.

(57) ABSTRACT

A rotatable armrest contains a body, a connecting mount, a joining member, and a cover. The body includes an inner rod and an outer rod. The inner rod has a rotating seat, a through hole, a first groove, a second groove, and two retaining shoulders. The connecting mount includes a locking rib and a column, the column has a slot and two notches. The joining member includes a first segment mounted in the through hole of the inner rod and a second segment fixed in the first groove of the inner rod, the first segment has two engaging blocks formed on an outer peripheral side thereof and a lock protrusion formed therein and accommodated in the slot, the second segment has a trench for receiving the cover, and the trench has a cutout which has two threaded orifices passing through the lock protrusion of the joining member.

3 Claims, 8 Drawing Sheets

ROTATABLE ARMREST

FIELD OF THE INVENTION

The present invention relates to a rotatable armrest which is simplified and is retracted easily.

BACKGROUND OF THE INVENTION

Referring to FIG. 1, a conventional rotatable armrest 1 contains a fixing mount 11 locked on one side of a chair 10, a toothed disc 12 connected with the fixing mount 11, a movable seat 13 coupled with an armrest 17, a resilient element 14 defined between the toothed disc 12 and the movable seat 13, and a screw bolt 15 inserted through a rotating knob 16 so as to screw with the movable seat 13 and the fixing mount 11, such that the movable seat 13 cooperates with the toothed disc 12 so as to position the rotatable armrest 1.

As desiring to rotate the armrest 17, the rotating knob 16 is rotated loosely so that the resilient element 14 pushes the toothed disc 12, and then the armrest 17 is rotated backwardly to be close to a chair back, thereafter the rotating knob 16 is rotated tightly so that the screw bolt 15 forces the movable seat 13 and the fixing mount 11 to engage with the toothed disc 12, thereby rotating and positioning the armrest 17.

However, before rotating the armrest 17, the rotating knob 16 is rotated several circles so that the toothed disc 12 disengages from the movable seat 13, and after the armrest 17 is rotated, the rotating knob 16 is rotated several circles again so as to fix the armrest 17, thus having troublesome operation. In addition, the rotatable armrest 1 is complicated to cause high production cost.

The present invention has arisen to mitigate and/or obviate the afore-described disadvantages.

SUMMARY OF THE INVENTION

The primary objective of the present invention is to provide a rotatable armrest which is simplified and is retracted easily.

DETAILED DESCRIPTION OF THE PREFERRED EMBODIMENTS

Figure 1:
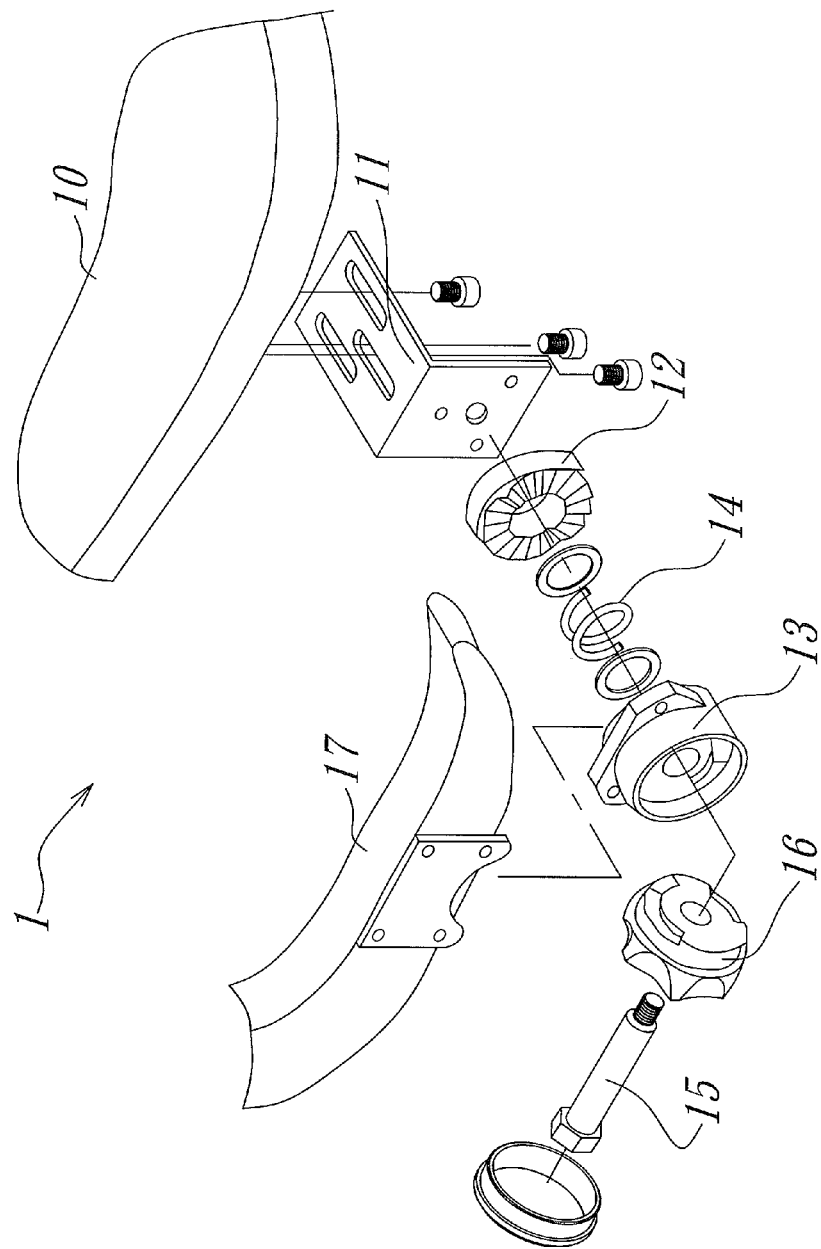
FIG. 1 is a perspective view of a conventional rotatable armrest.
Figure 2:
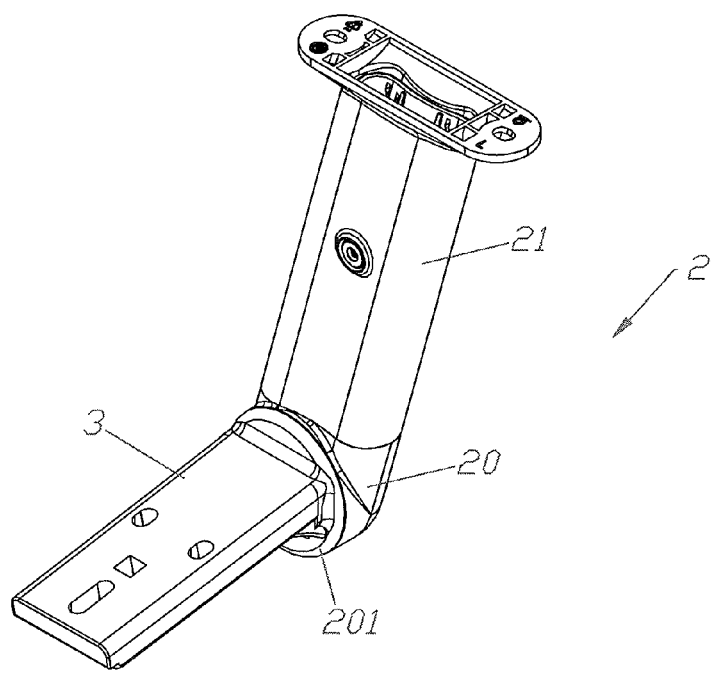
FIG. 2 is a perspective view showing the assembly of a rotatable armrest according to a preferred embodiment of the present invention.
Figure 3:
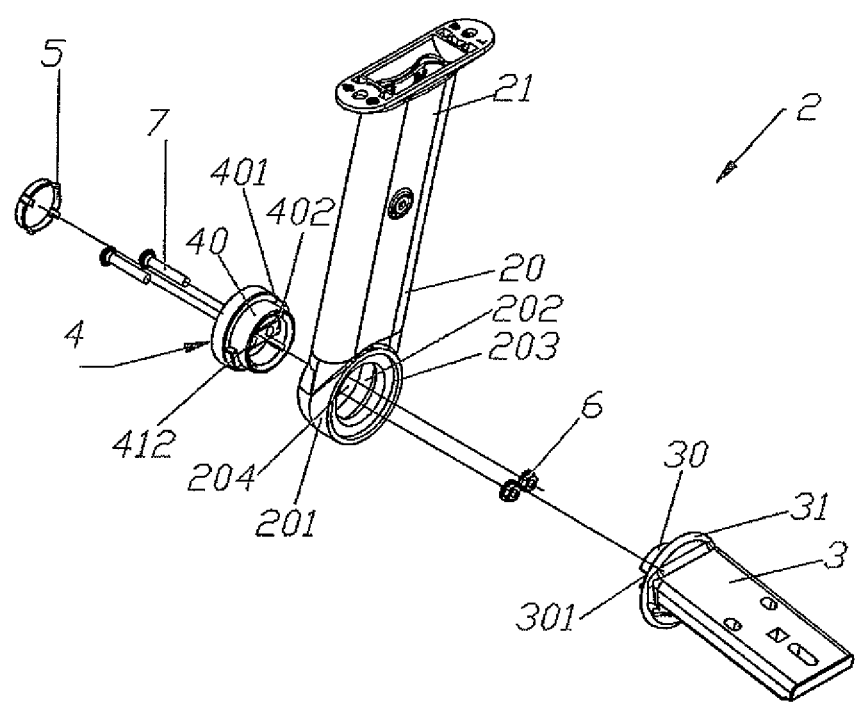
FIG. 3 is a perspective view showing the exploded components of the rotatable armrest according to the preferred embodiment of the present invention.
Figure 4:
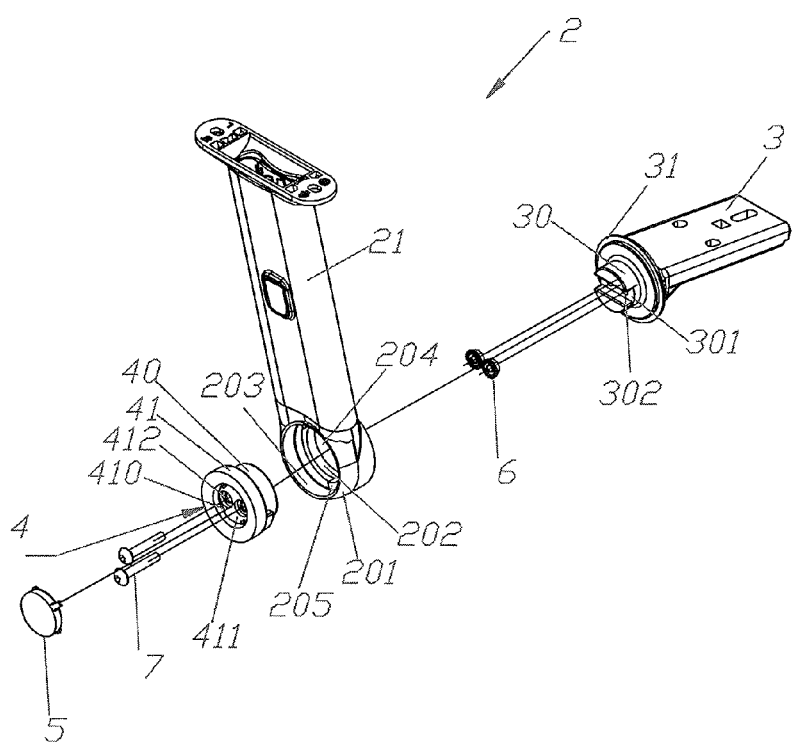
FIG. 4 is another perspective view showing the exploded components of the rotatable armrest according to the preferred embodiment of the present invention.
Figure 5:
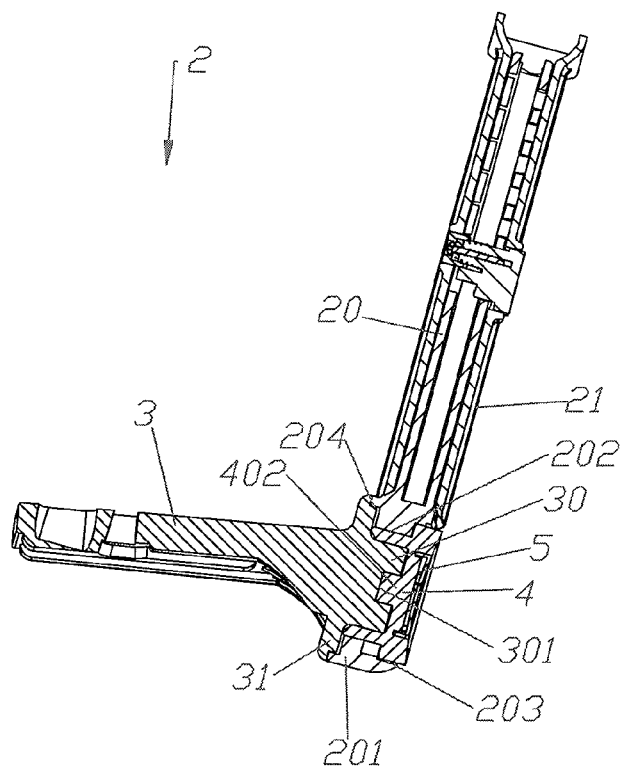
FIG. 5 is a cross sectional view showing the assembly of the rotatable armrest according to the preferred embodiment of the present invention.
Figure 6:
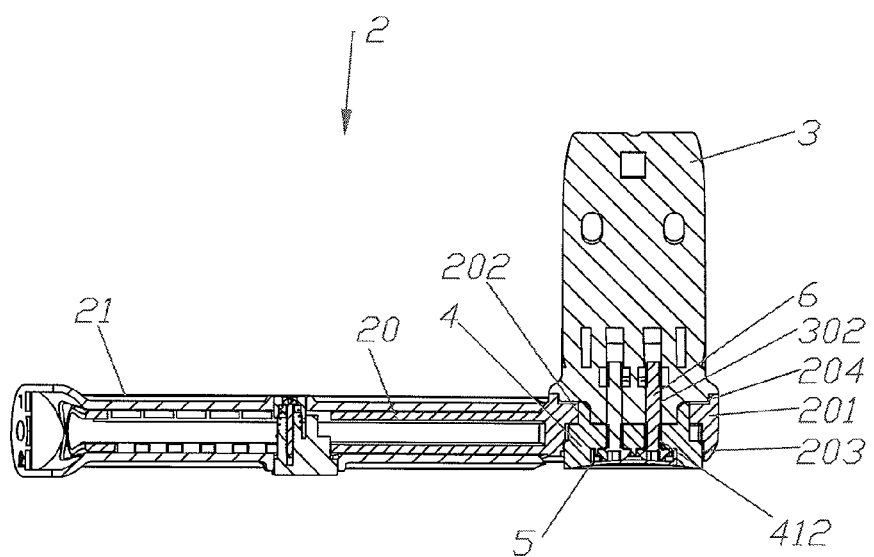
FIG. 6 is another cross sectional view showing the assembly of the rotatable armrest according to the preferred embodiment of the present invention.

With reference to FIGS. 2-7, a rotatable armrest according to a preferred embodiment of the present invention comprises: a body 2, a connecting mount 3, a joining member 4, and a cover 5. The body 2 includes an inner rod 20 and an outer rod 21, and the inner rod 20 has a circular rotating seat 201 extending downwardly from a lower end thereof, a through hole 202 defined on a central portion of the rotating seat 201, a first groove 203 formed on a first side of the through hole 202 so as to accommodate the joining member 4, a second groove 204 arranged on a second side of the through hole 202 so as to accommodate the connecting mount 3, and two retaining shoulders 205 extending to the first groove 203 from the through hole 202. The connecting mount 3 includes a locking rib 31 surrounding around a peripheral side of one end thereof so as to be positioned in the second groove 204, a column 30 extending outwardly from a central portion of the locking rib 31 and inserting into the joining member 4, wherein the column 30 has a slot 301 passing through a diameter section thereof and two notches 302 defined in the slot 301 and used to accommodate two nuts 6. The joining member 4 is in a T shape and includes a first segment 40 mounted in the through hole 202 of the inner rod 20 and a second segment 41 fixed in the first groove 203 of the inner rod 20, the first segment 40 has two engaging blocks 401 formed on an outer peripheral side thereof and a lock protrusion 402 formed therein and accommodated in the slot 301, the second segment 41 has a trench 410 for receiving the cover 5, and the trench 410 has a cutout 411 corresponding to the two notches 302 of the connecting mount 3, the cutout 411 has two threaded orifices 412 passing through the lock protrusion 402 of the joining member 4. In assembly, the locking rib 31 of the connecting mount 3 is placed in the second groove 204 of the inner rod 20, the joining member 4 is fixed in the through hole 202 and the first groove 203 of the inner rod 20, and the first segment 40 of the joining member 4 is fitted on the column 30 of the connecting mount 3, such that the lock protrusion 402 of the first segment 40 of the joining member 4 is mounted in the slot 301 of the column 30 of the connecting mount 3, and the two threaded orifices 412 of the joining member 4 align with the two nuts 6 in the two notches 302 of the connecting mount 3, hence two screws 7 are inserted through the two threaded orifices 412 of the joining member 4 so that two head tabs of the two screws 7 are located at the cutout 411 to screw with the two nuts 6, thereafter the cover 5 is covered on the trench 410, thus assembling the rotatable armrest.

Figure 7:
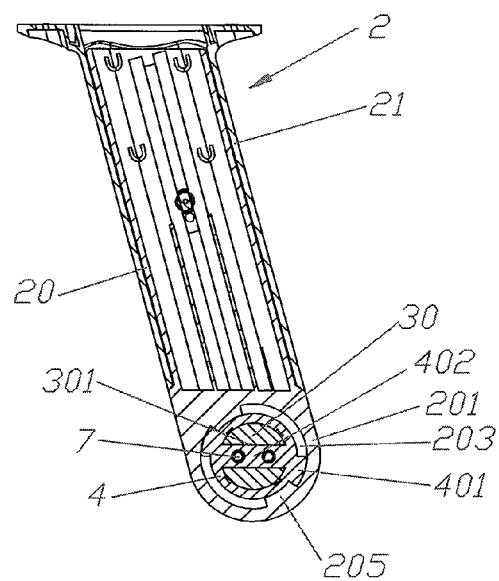
FIG. 7 is also another cross sectional view showing the assembly of the rotatable armrest according to the preferred embodiment of the present invention.
Figure 8:
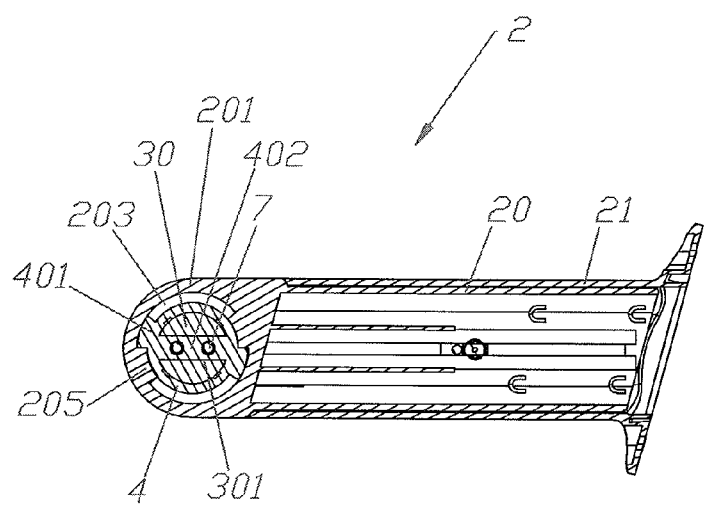
FIG. 8 is a cross sectional view showing the operation of the rotatable armrest according to the preferred embodiment of the present invention.

When the body 2 is longitudinally erected beside a chair, the two retaining shoulders 205 of the inner rod 20 are biased against the two engaging blocks 401 of the joining member 4 so as to limit the body 2 (as shown in FIG. 7); when the body 2 is rotatably retracted to a chair back, the inner rod 20 is rotated so that two retaining shoulders 205 of the inner rod 20 contact with the two engaging blocks 401 of the joining member 4, thus positioning the body 2 (as illustrated in FIG. 8).

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A rotatable armrest comprising:

a body, a connecting mount, a joining member, and a cover, the body supporting the armrest and including an inner rod and an outer rod; wherein the inner rod has a rotating seat extending downwardly from a lower end thereof, a through hole defined on a central portion of the rotating seat, a first groove formed on a first side of the through hole, a second groove arranged on a second side of the through hole, and two retaining shoulders extending to the first groove from the through hole;

the connecting mount includes a locking rib surrounding a periphery of one end of the connecting mount and positioned in the second groove, a column extending outwardly from a central portion of the locking rib and inserting into the joining member, the column has a slot passing through a diameter section thereof and two notches defined in the slot;

the joining member includes a first segment mounted in the through hole of the inner rod and a second segment fixed in the first groove of the inner rod, the first segment has two engaging blocks formed on an outer periphery thereof and has a lock protrusion formed therein and accommodated in the slot, the second segment has a trench for receiving the cover, and the trench has a cutout which has two threaded orifices passing through the lock protrusion of the joining member.

2. The rotatable armrest as claimed in claim 1, wherein the cutout of the trench and the two threaded orifices of the joining member correspond to the two notches of the connecting mount, hence two screws are inserted through the two threaded orifices of the joining member so that the two screws are located at the cutout to screw with two nuts.

3. The rotatable armrest as claimed in claim 1, wherein when the inner rod is rotated, the two retaining shoulders of the inner rod contact with the two engaging blocks of the joining member so as to position the body.

* * * * *